United States Patent
Ikeno et al.

(10) Patent No.: US 9,414,032 B2
(45) Date of Patent: Aug. 9, 2016

(54) VIDEO PROJECTION APPARATUS CAPABLE OF OPERATING AT OPTIMUM RESONANT FREQUENCY AND ITS CONTROLLING METHOD

(71) Applicant: STANLEY ELECTRIC CO., LTD., Meguro-ku, Tokyo (JP)

(72) Inventors: Ryohei Ikeno, Yokohama (JP); Takao Saito, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/886,903

(22) Filed: Oct. 19, 2015

(65) Prior Publication Data

US 2016/0119596 A1 Apr. 28, 2016

(30) Foreign Application Priority Data

Oct. 23, 2014 (JP) .................................. 2014-216269

(51) Int. Cl.
| | | |
|---|---|---|
| *H04N 3/08* | (2006.01) | |
| *H04N 9/31* | (2006.01) | |
| *H04N 5/64* | (2006.01) | |
| *G02B 26/08* | (2006.01) | |
| *G02B 26/10* | (2006.01) | |
| *H04N 9/14* | (2006.01) | |

(52) U.S. Cl.
CPC .......... *H04N 9/3135* (2013.01); *G02B 26/0833* (2013.01); *G02B 26/105* (2013.01); *H04N 9/14* (2013.01)

(58) Field of Classification Search
CPC . H04N 9/3197; H04N 9/3129; H04N 9/3141; H04N 9/31; H04N 9/12; H04N 9/14; H04N 9/3135; H04N 5/7408; G09G 3/22; G09G 3/025; G09G 3/003; G02B 26/0833; G02B 26/105; G02B 27/0101; G02B 27/01; G02B 27/017; G02B 27/0172
USPC ......... 348/203, 205, 744, 790–792, 781, 832; 345/7–9; 353/37, 50, 77, 98
IPC ...................................... H04N 9/31, 5/64, 3/08
See application file for complete search history.

(56) References Cited

U.S. PATENT DOCUMENTS

| | | | |
|---|---|---|---|
| 6,424,925 B1 | 7/2002 | Ku et al. | |
| 2007/0258122 A1* | 11/2007 | Chamgoulov et al. | ................... G02B 21/0036 702/1 |
| 2010/0315552 A1 | 12/2010 | Rothaar et al. | |

FOREIGN PATENT DOCUMENTS

| | | |
|---|---|---|
| JP | 2012530264 A | 11/2012 |
| WO | 0117278 A2 | 3/2001 |

OTHER PUBLICATIONS

Extended European Search Report dated Feb. 10, 2016, issued in counterpart European Application No. 15190968.6.

*Primary Examiner* — Sherrie Hsia

(74) *Attorney, Agent, or Firm* — Holtz, Holtz & Volek PC

(57) ABSTRACT

A video projection apparatus includes: a light source; an optical deflector having a mirror for reflecting light to project a view field, an actuator for rocking the mirror with an axis of the mirror and a sensor provided in the vicinity of the actuator; and a control unit. The control unit generates a sine-wave voltage applied to the actuator and a cosine-wave voltage; calculates a first convolution between the sine-wave voltage and a sense voltage from the sensor; calculates a second convolution between the cosine-wave voltage and the sense voltage; converts an orthogonal coordinate formed by the first convolution and the second convolution into a polar coordinate formed by a radius component and an angle component; and sweeps the frequency of the first and second voltages so that the frequency is defined as a resonant frequency when the radius component is maximum.

8 Claims, 10 Drawing Sheets

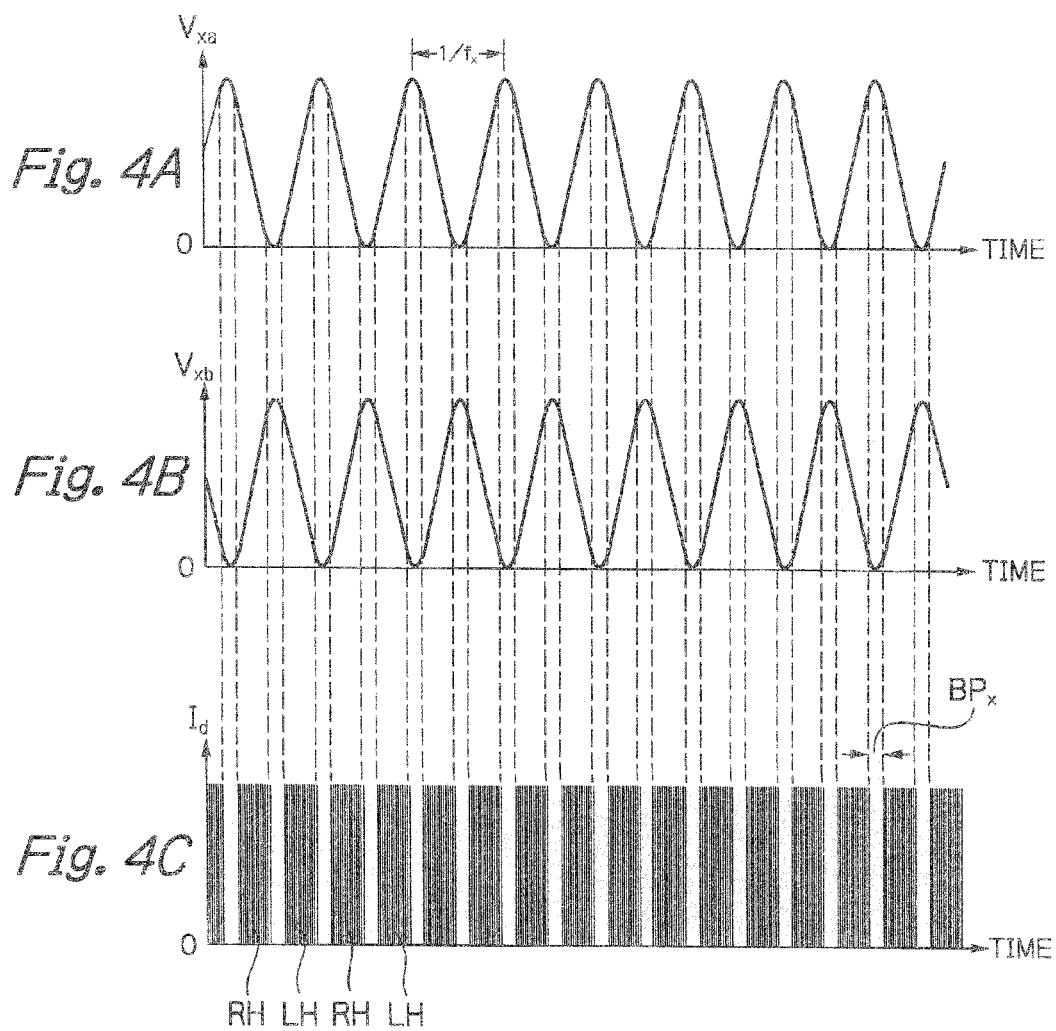

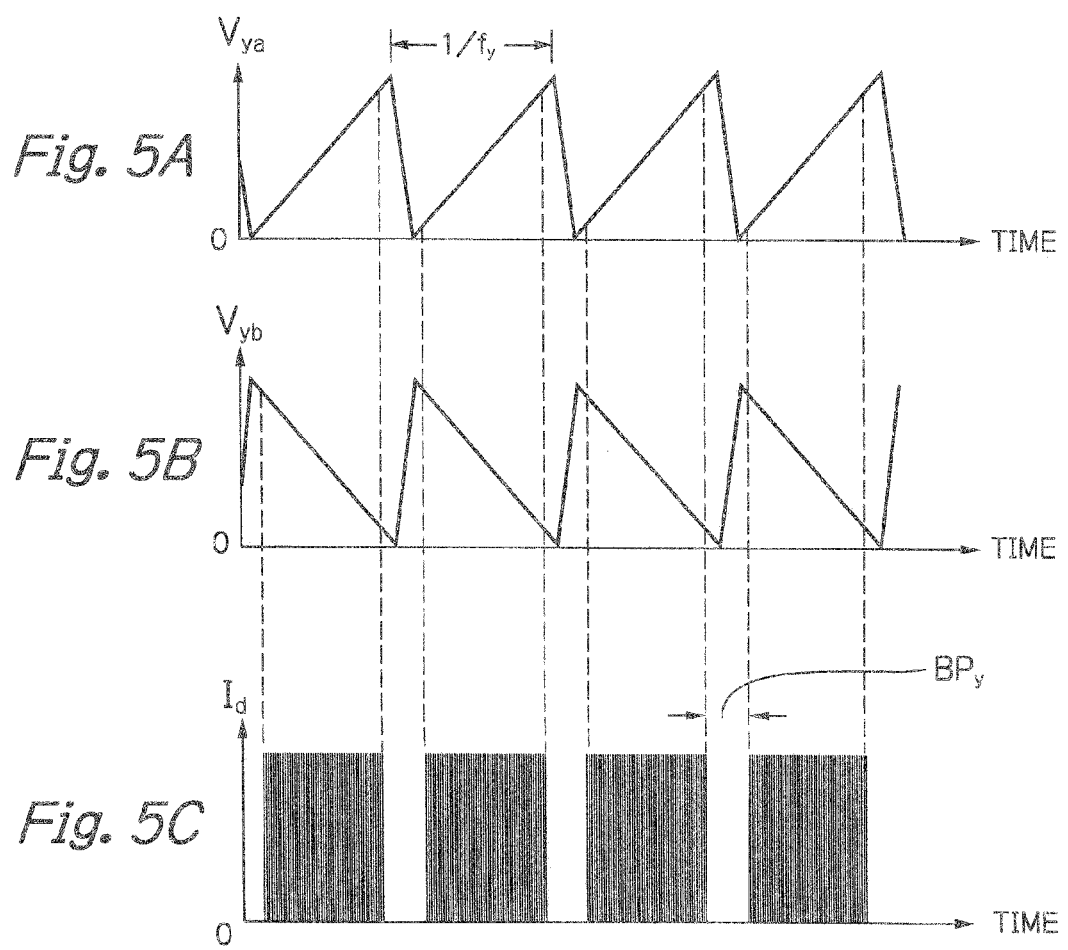

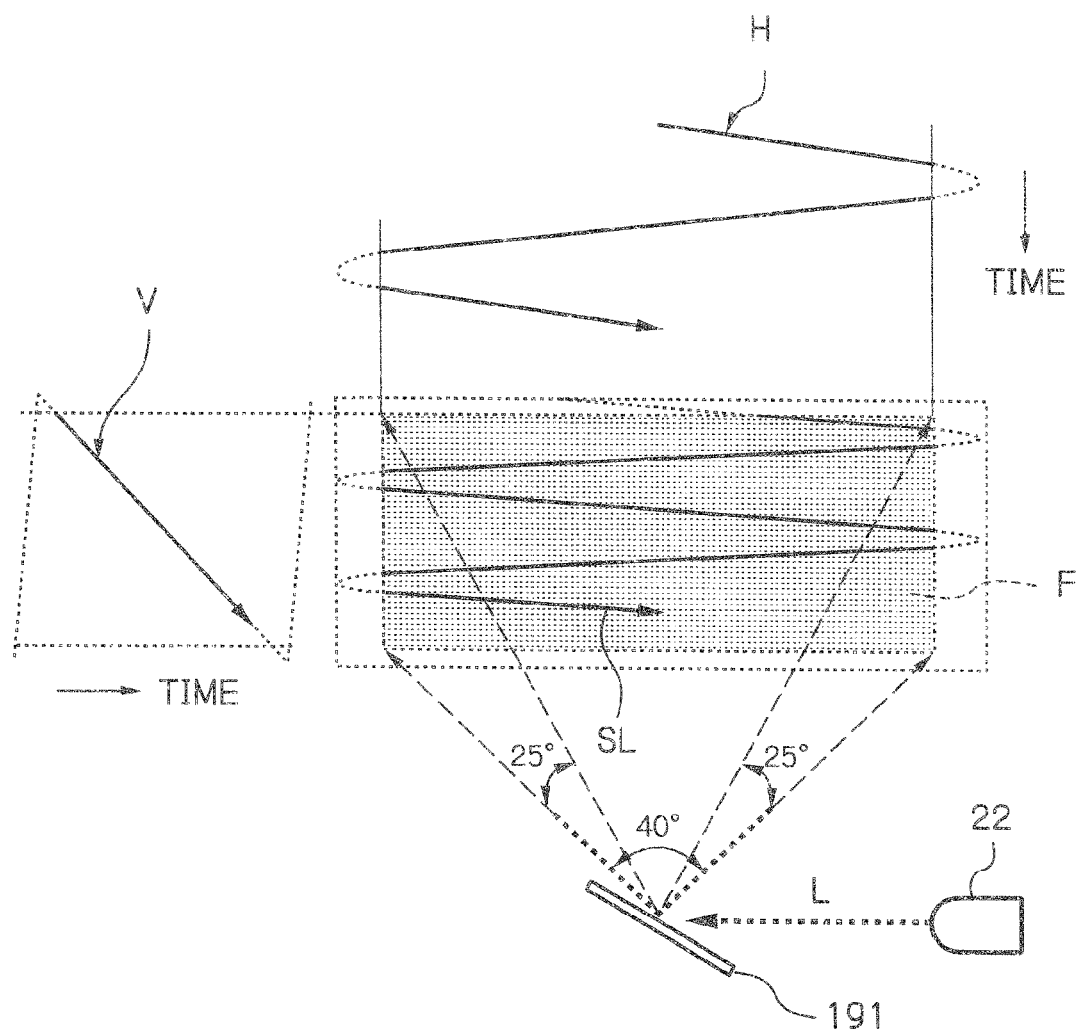

VIDEO PROJECTION APPARATUS CAPABLE OF OPERATING AT OPTIMUM RESONANT FREQUENCY AND ITS CONTROLLING METHOD

This application claims the priority benefit under 35 U.S.C. §119 to Japanese Patent Application No. JP2014-216269 filed on Oct. 23, 2014, which disclosure is hereby incorporated in its entirety by reference.

BACKGROUND

1. Field

The presently disclosed subject matter relates to a video projection apparatus and its controlling method. The video projection apparatus can be used as a pico projector, a head mount display (HMD) unit, a head up display (HUD) unit and the like.

2. Description of the Related Art

A prior art video projection apparatus is constructed by a two-dimensional optical deflector as an optical scanner manufactured by a micro electro mechanical system (MEMS) device manufactured using a semiconductor process and micro machine technology (see: JP2012-530264A & US2010/0315552A1). Since the MEMS optical scanner is focus-free, the video projection apparatus can be small in size.

In the above-described prior art video projection apparatus, when rocking the MEMS scanner in a main scanning at a high resonant frequency, a digital phase locked loop (PLL) circuit is provided to receive a sense voltage from a sensor within the optical deflector and generate a phase signal phase-locked to the sense voltage.

In the above-described prior art video projection apparatus, however, since the MEMS scanner is susceptible to electromagnetic interference (EMI) noises and external noises by environmental factors such as temperature and humidity, the digital PLL circuit may not operate at an optimal frequency and phase, so that an optimum resonant frequency would not be realized. As a result, it is difficult to accurately control a projected view field.

Also, in the above-described prior art video projection apparatus, although the frequency and phase are locked, the amplitude of the sense voltage representing the flexing angle of a mirror of the MEMS scanner can not be monitored by the digital PLL circuit, it would be difficult to accurately realize an optimum resonant frequency. As a result, it is difficult to accurately control a projected view field.

SUMMARY

The presently disclosed subject matter seeks to solve the above-described problem.

According to the presently disclosed subject matter, a video projection apparatus includes: a light source; an optical deflector having a mirror for reflecting light from the light source to project a view field, an actuator for rocking the mirror with an axis of the mirror and a sensor provided in the vicinity of the actuator; and a control unit. The control unit generates a first sinusoidal-wave voltage applied to the actuator and a second sinusoidal-wave voltage having the same frequency as that of the first sinusoidal-wave voltage and a difference in phase of 90° to the first sinusoidal-wave voltage; calculates a first convolution between the first sinusoidal-wave voltage and a sense voltage from the sensor; calculates a second convolution between the second sinusoidal-wave voltage and the sense voltage; converts an orthogonal coordinate formed by the first convolution and the second convolution into a polar coordinate formed by a radius component and an angle component; and sweeps the frequency of the first and second sinusoidal-wave voltages so that the frequency of the first and second sinusoidal-wave voltages is defined as a resonant frequency when the radius component is maximum.

Also, in a method for controlling a video projection apparatus including: a light source; and an optical deflector having a mirror for reflecting light from the light source to project a view field, an actuator for rocking the mirror with an axis of the mirror and a sensor provided in the vicinity of the actuator, the method includes: generating a first sinusoidal-wave voltage applied to the actuator and a second sinusoidal-wave voltage having the same frequency as that of the first sinusoidal-wave voltage and a difference in phase of 90° to the first sinusoidal-wave voltage; calculating a first convolution between the first sinusoidal-wave voltage and a sense voltage from the sensor; calculating a second convolution between the second sinusoidal-wave voltage and the sense voltage; converting an orthogonal coordinate formed by the first convolution and the second convolution into a polar coordinate formed by a radius component and an angle component; and sweeping the frequency of the first and second sinusoidal-wave voltages so that the frequency of the first and second sinusoidal-wave voltages is defined as a resonant frequency when the radius component is maximum.

According to the presently disclosed subject matter, since a resonant frequency is determined by the maximum radius component, the resonant frequency can be optimum, so that the projected view field can accurately be controlled.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIGS. 4A, 4B and 4C are timing diagrams for explaining the horizontal operation of the MEMS optical deflector of FIG. 1;

FIGS. 5A, 5B and 5C are timing diagrams for explaining the vertical operation of the MEMS optical deflector of FIG. 1;

FIG. 6 is a diagram showing the relationship between a scanning locus of the MEMS optical deflector and a projected view field of the laser beam of the laser light source of FIG. 1;

DETAILED DESCRIPTION OF EXEMPLARY EMBODIMENTS

Figure 1:
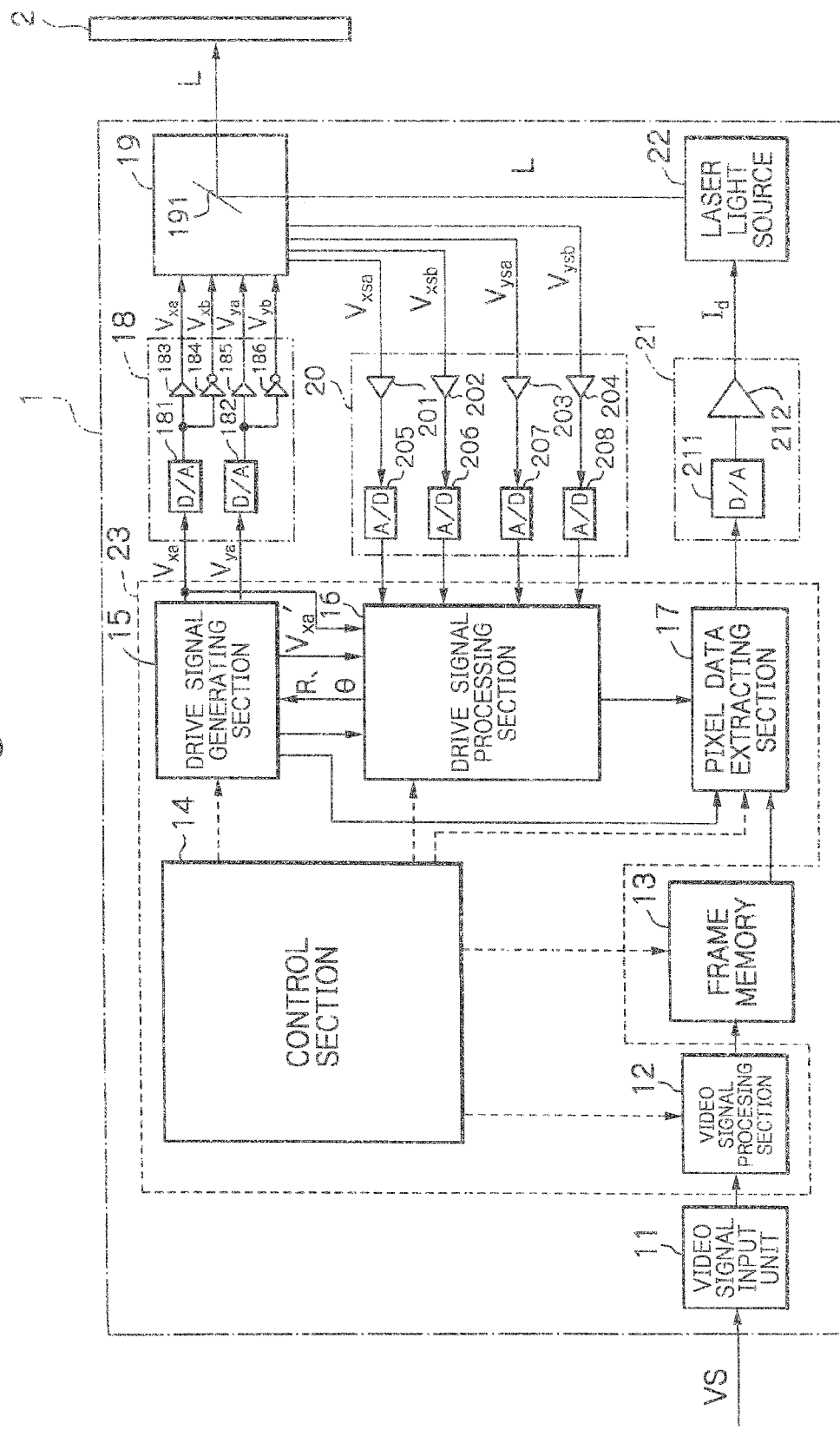
FIG. 1 is a block circuit diagram illustrating an embodiment of the video projection apparatus according to the presently disclosed subject matter.

In FIG. 1, which illustrates an embodiment of the video projection apparatus according to the presently disclosed subject matter, a video projection apparatus 1 receives a video signal VS from a video source such as a personal computer or a camera system to generate a laser beam L for a screen 2.

The video projection apparatus 1 is constructed by a video signal input unit 11, a video signal processing section 12, a frame memory 13 and a control section 14 for controlling the video signal processing section 12 and the frame memory 13.

The video signal input unit 11 is an analog red/green/blue (RGB) receiver or a digital video signal receiver such as a digital video interface (DVI), or a high-definition multimedia interface (HDMI). Video signals received by the video signal input unit 11 are processed by a video signal processing section 12 and are stored in the frame memory 13 frame by frame. For example, 60 frames per second are stored in the frame memory 13. The frame memory 13 is formed by a high-speed random access memory (RAM) such as an SDRAM, a DDR2 SDRAM or a DDR3 SDRAM. In this case, one frame of the frame memory 13 corresponds to a view field formed by a horizontal angle of 40° and a vertical angle of 25° (see: FIG. 6).

Also, the video projection apparatus 1 is constructed by a drive signal generating section 15, a drive signal processing section 16, and a pixel data extracting section 17. The drive signal generating section 15 generates drive voltages $V_{xa}$ and $V_{ya}$ which are transmitted via a drive unit 18 formed by digital-to-analog (D/A) converters 181 and 182, amplifiers 183 and 184, and inverters 185 and 186 to a MEMS optical deflector 19. In this case, the drive voltages $V_{xa}$ and $V_{ya}$ and their inverted drive voltages $V_{xb}$ and $V_{yb}$ are supplied to the MEMS optical deflector 19. On the other hand, the MEMS optical deflector 19 generates sense voltages $V_{xss}$, $V_{xsb}$; and $V_{ysa}$, $V_{ysb}$; in response to the flexing angle of the mirror thereof which are supplied via a sense signal input unit 20 formed by amplifiers 201, 202, 203 and 204 and analog-to-digital (A/D) converters 205, 206, 207 and 208 to the drive signal processing section 16. The pixel data extracting section 17 generates a drive signal which is supplied to a light source drive unit 21 formed by a D/A converter 211 and an amplifier 212 for supplying a drive current $I_d$ to a laser light source 22. Note that the light source drive unit 21 and the laser light source 22 can be provided for each of red (R), green (G) and blue (B). Also, the laser light source 22 can be replaced by a light emitting diode (LED) source.

The drive signal generating section 15, the drive signal processing section 16 and the pixel data extracting section 17 are controlled by the control section 14.

In more detail, the drive signal generating section 15 transmits extracting timing signals of pixel data to the pixel data extracting section 17. Also, the drive signal processing section 16 receives drive signals similar to the drive voltages $V_{xa}$ and $V_{ya}$ from the drive signal generating section 15 and the sense voltages $V_{xsa}$, $V_{xsb}$, $V_{ysa}$ and $V_{ysb}$ from the sense signal input unit 20 to transmit a delay timing signal to the pixel data extracting section 17 due to the delay transmission of the drive voltages $V_{xa}$ and $V_{ya}$ to the mirror of the MEMS optical deflector 19. Further, the pixel data extracting section 17 extracts pixel data from the frame memory 13 in accordance with the extracting timing signals of the drive signal generating section 15 and the delay signal of the drive signal processing section 16.

In FIG. 1, the video signal processing section 12, the control section 14, the drive signal generating section 15, the drive signal processing section 16 and the pixel data extracting section 17 can be formed by a single control unit 23 or microcomputer using a field-programmable gate array (FPGA), an extensible processing platform (EPP) or a system-on-a-chip (SoC). The control section 14 has an interface function with a universal aysynchronous receiver transmitter (UART) and the like.

Figure 2:
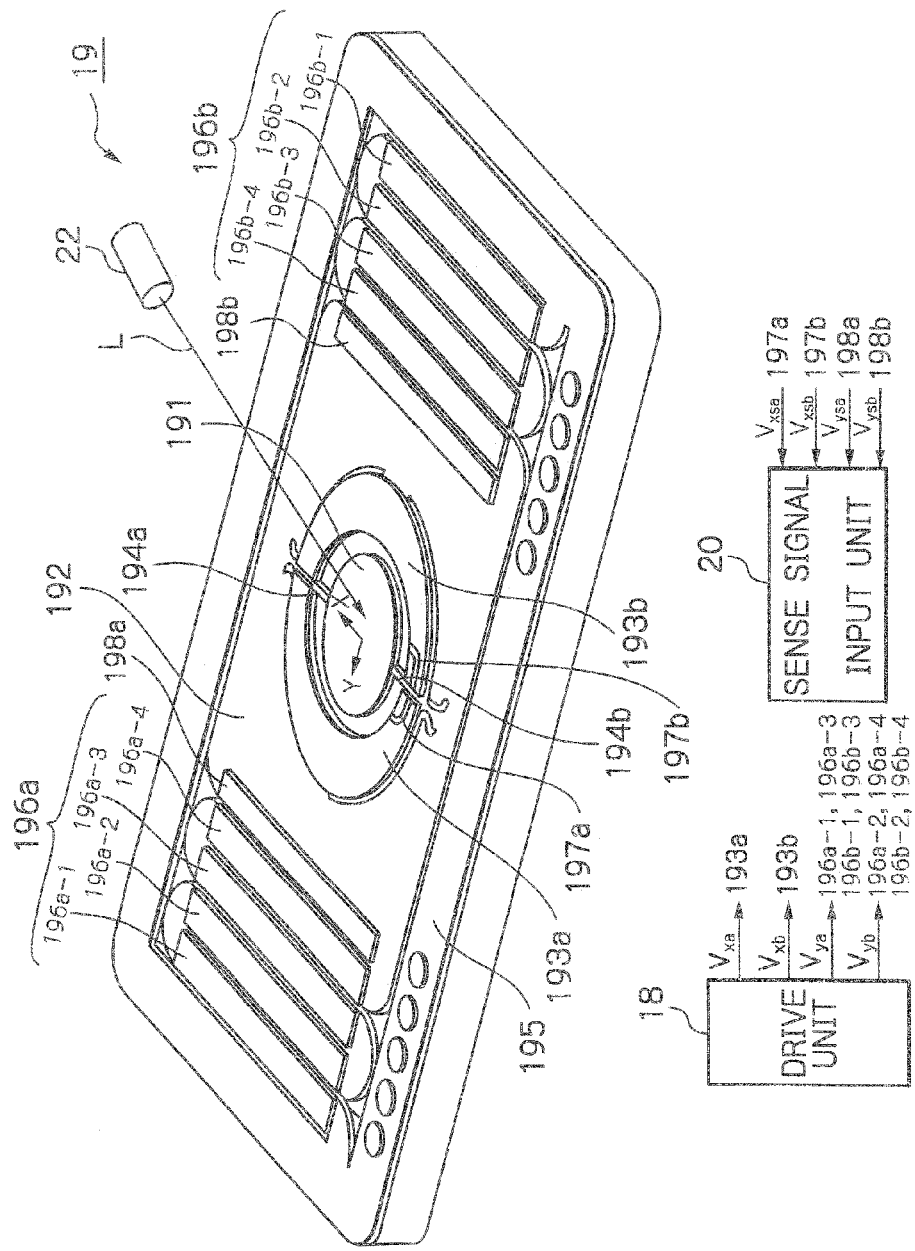
FIG. 2 is a perspective view of the MEMS optical deflector of FIG. 1.

In FIG. 2, which is a perspective view of the MEMS optical deflector 19 of FIG. 1, the MEMS optical deflector 19 is constructed by a circular mirror 191 for reflecting incident light L from the laser light source 22, an inner frame (movable frame) 192 surrounding the mirror 191 for supporting the mirror 191, a pair of torsion bars 194a and 194b coupled between the mirror 191 and the inner frame 192, a pair of inner piezoelectric actuators 193a and 193b coupled between the inner frame 192 and the mirror 191 and serving as cantilevers for rocking the mirror 191 with respect to an X-axis of the mirror 191, an outer frame (support frame) 195 surrounding the inner frame 192, a pair of meander-type outer piezoelectric actuators 196a and 196b coupled between the outer frame 195 and the inner frame 192 and serving as cantilevers for rocking the mirror 191 through the inner frame 192 with respect to a Y-axis of the mirror 191 perpendicular to the X-axis, piezoelectric sensors 197a and 197b in the proximity of the inner piezoelectric actuators 193a and 193b at an edge of the torsion bar 194b, and piezoelectric sensors 198a and 198b on the inner frame 192 in the proximity of the outer piezoelectric actuators 196a and 196b.

The inner frame 192 is rectangularly-framed to surround the mirror 191 associated with the inner piezoelectric actuators 193a and 193b.

The torsion bars 194a and 194b are arranged along the X-axis, and have ends coupled to the inner circumference of the inner frame 192 and other ends coupled to the outer circumference of the mirror 191. Therefore, the torsion bars 194a and 194b are twisted by the inner piezoelectric actuators 193a and 193b to rock the mirror 191 with respect to the X-axis.

The inner piezoelectric actuators 193a and 193b oppose each other along the Y-axis and sandwich the torsion bars 194a and 194b. The inner piezoelectric actuators 193a and 193b have ends coupled to the inner circumference of the inner frame 192 and other ends coupled to the torsion bars 194a and 194b. In this case, the flexing direction of the inner piezoelectric actuator 193a is opposite to that of the inner piezoelectric actuator 193b.

The outer frame 195 is rectangularly-framed to surround the inner frame 192 via the outer piezoelectric actuators 196a and 196b.

The outer piezoelectric actuators 196a and 196b are coupled between the inner circumference of the outer frame 195 and the outer circumference of the inner frame 192, in order to rock the inner frame 192 associated with the mirror 191 with respect to the outer frame 195, i. e., to rock the mirror 191 with respect to the Y-axis.

The outer piezoelectric actuator 196a is constructed by piezoelectric cantilevers 196a-1, 196a-2, 196a-3 and 196a-4 which are serially-coupled from the outer frame 195 to the inner frame 192. Also, each of the piezoelectric cantilevers 196a-1, 196a-2, 196a-3 and 196a-4 are in parallel with the X-axis of the mirror 191. Therefore, the piezoelectric cantilevers 196a-1, 196a-2, 196a-3 and 196a-4 are folded at every cantilever or meandering from the outer frame 195 to the inner frame 192, so that the amplitudes of the piezoelectric cantilevers 196a-1, 196a-2, 196a-3 and 196a-4 can be changed along directions perpendicular to the Y-axis of the mirror 191.

Similarly, the outer piezoelectric actuator 196b is constructed by piezoelectric cantilevers 196b-1, 196b-2, 196b-3 and 196b-4 which are serially-coupled from the outer frame 195 to the inner frame 192. Also, each of the piezoelectric cantilevers 196b-1, 196b-2, 196b-3 and 196b-4 are in parallel with the X-axis of the mirror 191. Therefore, the piezoelectric cantilevers 196b-1, 196b-2, 196b-3 and 196b-4 are folded at every cantilever or meandering from the outer frame 195 to the inner frame 192, so that the amplitudes of the piezoelectric cantilevers 196b-1, 196b-2, 196b-3 and 196b-4 can be changed along directions perpendicular to the Y-axis of the mirror 191.

Note that the number of piezoelectric cantilevers in the outer piezoelectric actuator 196a and the number of piezoelectric cantilevers in the outer piezoelectric actuator 196b can be other values such as 2, 6, 8, . . . .

The piezoelectric sensors 197a and 197b serve as speed sensors that sense deflection angle deviations of the mirror 191 mainly caused by the inner piezoelectric actuators 193a and 193b. The output signals of the piezoelectric sensors 197a and 197b are substantially the same as each other, and opposite in phase to each other. These two output signals correspond to differentiated signals of the drive voltages $V_{xa}$ and $V_{xb}$. Also, a difference signal between the two output signals would cancel noises included therein. Note that one of the piezoelectric sensors 197a and 197b can be omitted.

The piezoelectric sensors 198a and 198b serve as speed sensors that sense deflection angle signals of the mirror 191 mainly caused by the outer piezoelectric actuators 196a and 196b. Note that the output signals of the piezoelectric sensors 196a and 196b are substantially the same as each other. These output signals correspond to a differentiated signal of the drive voltage $V_{ya}$ or $V_{yb}$. Note that one of the piezoelectric sensors 198a and 198b can be omitted.

The structure of each element of the MEMS optical deflector 19 is explained below.

The mirror 191 is constructed by a monocrystalline silicon support layer serving as a vibration plate and a metal layer serving as a reflector.

The inner frame 192, the torsion bars 194a and 194b and the outer frame 195 are constructed by the monocrystalline silicon support layer and the like.

Each of the piezoelectric actuators 194a and 194b and the piezoelectric cantilevers 196a-1 to 196a-4 and 196b-1 to 196b-4 and the piezoelectric sensors 197a, 197b, 198a and 198b is constructed by a Pt lower electrode layer, a lead titanate zirconate (PZT) layer and a Pt upper electrode layer.

The meander-type piezoelectric actuators 196a and 196b are described below.

In the piezoelectric actuators 196a and 196b, the piezoelectric cantilevers 196a-1, 196a-2, 196a-3, 196a-4, 196b-1, 196b-2, 196b-3 and 196b-4 are divided into an odd-numbered group of the piezoelectric cantilevers 196a-1 and 196a-3; 196b-1 and 196b-3, and an even-numbered group of the piezoelectric cantilevers 196a-2 and 196a-4; 196b-2 and 196b-4 alternating with the odd-numbered group of the piezoelectric cantilevers 196a-1 and 196a-3; 196b-1 and 196b-3.

Figure 3A:
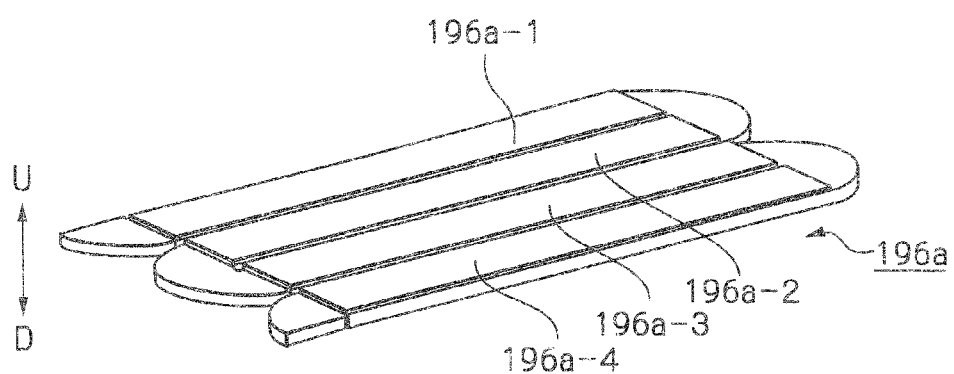
FIGS. 3A and 3B are perspective views for explaining the operation of the outer piezoelectric actuator of FIG. 2.
Figure 3B:
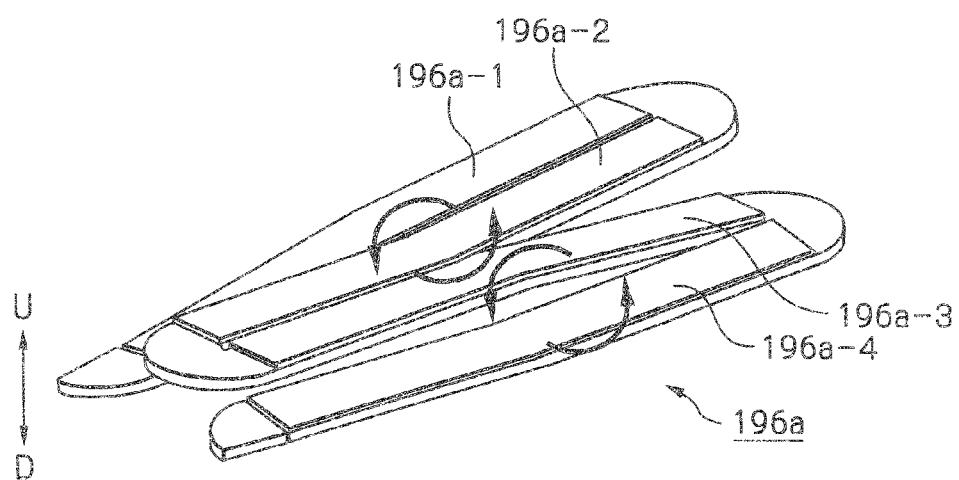

FIGS. 3A and 3B are perspective views for explaining the operation of the piezoelectric cantilevers of one outer piezoelectric actuator such as 196a of FIG. 2. Note that FIG. 3A illustrates a non-operation state of the piezoelectric cantilevers 196a-1, 196a-2, 196a-3 and 196a-4 of the piezoelectric actuator 196a, and FIG. 3B illustrates an operation state of the piezoelectric cantilevers 196a-1, 196a-2, 196a-3 and 196a-4 of the outer piezoelectric actuator 196a.

For example, as illustrated in FIG. 3B which illustrates only the piezoelectric cantilevers 196a-1, 196a-2, 196a-3 and 196a-4, when the odd-numbered group of the piezoelectric cantilevers 196a-1, 196a-3, 196b-1 and 196b-3 are flexed in one direction, for example, in a downward direction D, the even-numbered group of the piezoelectric cantilevers 196a-2, 196a-4, 196b-2 and 196b-4 are flexed in the other direction, i.e., in an upward direction U. On the other hand, when the odd-numbered group of the piezoelectric cantilevers 196a-1, 196a-3, 196b-1 and 196b-3 are flexed in the upward direction, the even-numbered group of the piezoelectric cantilevers 196a-2, 196a-4, 196b-2 and 196b-4 are flexed in the downward direction D.

Thus, the mirror 191 is rocked with respect to the Y-axis.

First, a main scanning operation or horizontal scanning operation by rocking the mirror 191 with respect to the X-axis is explained in detail with reference to FIGS. 4A, 4B and 4C.

As illustrated in FIGS. 4A and 4B, the drive voltage $V_{xa}$ and the drive voltage $V_{xb}$ generated from the drive unit 18 are sinusoidal at a relatively high resonant frequency $f_x$ and symmetrical or opposite in phase to each other. As a result, the inner piezoelectric actuators 193a and 193b carry out flexing operations in opposite directions to each other, so that the torsion bars 194a and 194b are twisted to rock the mirror 191 with respect to the X-axis.

In this case, the changing rates of the drive voltages $V_{xa}$ and $V_{xb}$ are low at their lowest and highest levels as illustrated in FIGS. 4A and 4B, so that the brightness thereof at the screen 2 would be particularly high. Therefore, as illustrated in FIG. 4C, horizontal blanking periods $BP_X$ for turning off the laser light source 22 are provided where the changing rates of the drive voltages $V_{xa}$ and $V_{xb}$ are low to make the brightness at the entire screen 2 uniform. Additionally, right-direction horizontal scanning periods RH alternating with left-direction horizontal scanning periods LH are provided between the horizontal blanking periods $BP_x$, in order to increase the depicting time period, and thus the depicting efficiency can be enhanced.

Next, a sub scanning operation or vertical scanning operation by rocking the mirror 191 with respect to the Y-axis is explained in detail with reference to FIGS. 5A, 5B and 5C.

As illustrated in FIGS. 5A and 5B, the drive voltage $V_{ya}$ and the drive voltage $V_{yb}$ are saw-tooth-shaped at a relatively low non-resonant frequency $f_Y$ and symmetrical or opposite in phase to each other. As a result, the piezoelectric cantilevers 196a-1, 196a-3, 196b-1 and 196b-3 and the piezoelectric cantilevers 196a-2, 196a-4, 196b-2 and 196b-4 carry out flexing operations in opposite directions to each other, so that the mirror 191 is rocked with respect to the Y-axis.

In this case, the changing rate of the drive voltages $V_{ya}$ and $V_{yb}$ are low at their lowest and highest levels as illustrated in FIGS. 5A and 5B, so that the brightness thereof at the screen 2 would be particularly high. Therefore, as illustrated in FIG. 5C, vertical blanking periods $BP_Y$ for turning off the laser light source 22 are provided where the changing rates of the drive voltages $V_{ya}$ and $V_{yb}$ are low to make the brightness at the entire screen 2 uniform.

As illustrated in FIG. 6, which is a diagram illustrating a relationship between a scanning locus SL of the MEMS optical deflector 19 and a projected area of the laser beam L of the laser light source 22 of FIG. 1, a horizontal scanning line H and a vertical scanning line V by the MEMS optical deflector 19 are protruded from a projected view field F of the laser beam L defined by a horizontal angle of 40° for example, and a vertical angle of 25°, for example.

Next, the resonant frequency $f_r$ of the main scanning operation is explained next with reference to FIGS. 7, 8A, 8B, 9A and 9B.

Since the piezoelectric sensor 197a serves as a speed sensor as stated before, the sinusoidal drive voltage $V_{xa}$ will be converted by the piezoelectric sensor 197a into a sinusoidal sense voltage whose phase is delayed by 90° as compared with a phase of the sinusoidal drive signal $V_{xa}$. In other words, if the drive voltage $V_{xa}$ is sine-waved, the sense voltage $V_{xsa}$ is cosine-waved.

Figure 7:
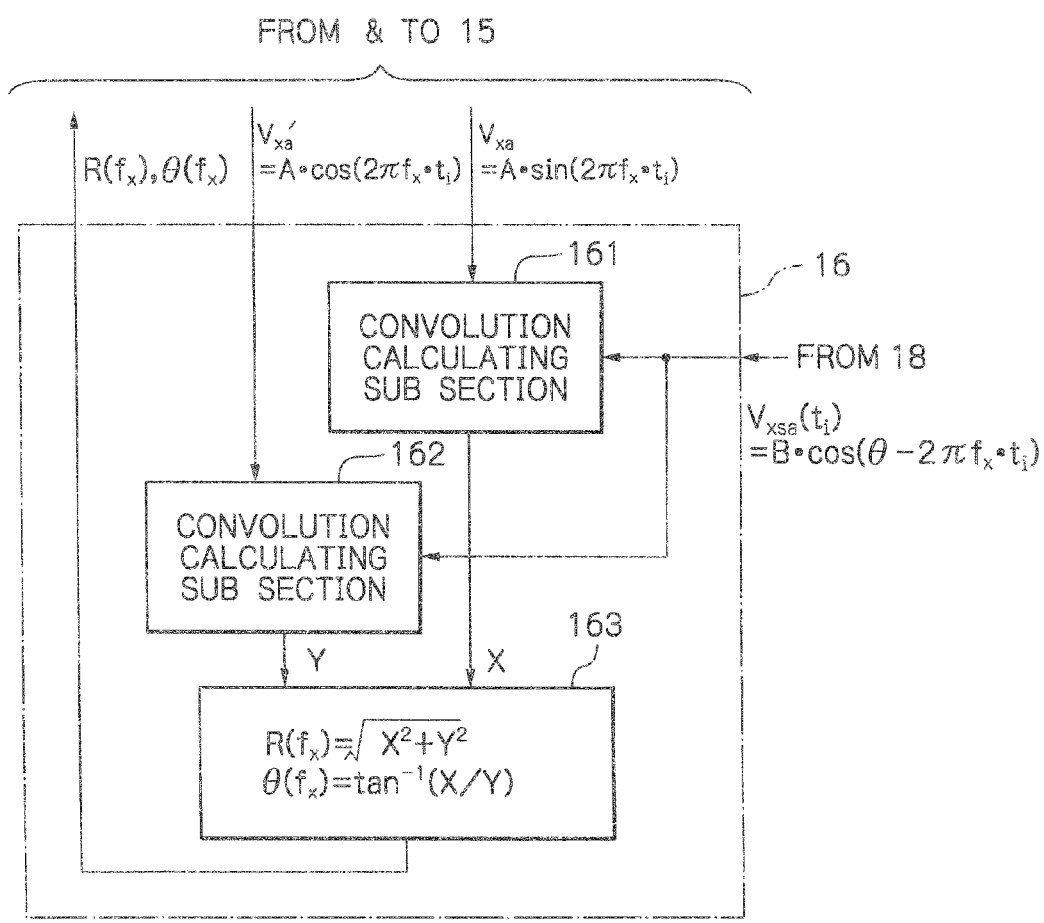
FIG. 7 is a detailed block diagram of the drive signal processing section of FIG. 1.

In FIG. 7, which is a detailed block diagram of the drive signal processing section 16 of FIG. 1 for processing the sense voltage $V_{xsa}$, convolution calculating sub sections 161 and 162 and an orthogonal coordinate-to-polar coordinate converting sub section 163 are provided.

Note that the elements other than the convolution calculating sub sections 161 and 162 and the orthogonal coordinate-to-polar coordinate converting sub section 163 are omitted from FIG. 7, in order to simplify the description.

In FIG. 7, the drive voltage $V_{xa}$ is represented by $$V_{xa} = A \cdot \sin(2\pi f_x \cdot t_i)$$

where A is an amplitude;
$f_x$ is a frequency; and
$t_i$ is a timing point.
Also, a voltage $V_{xa}'$ is represented by $$V_{xa}' = A \cdot \cos(2\pi f_x \cdot t_i).$$

That is, the drive voltage $V_{xa}$ and the voltage $V_{xa}'$ are both sinusoidal-wave voltages with a phase difference of 90° therebetween.

Further, a sense voltage $V_{xsa}$ is represented by $$V_{xsa} = B \cdot \cos(2\pi f_x \cdot t_i - \theta) = B \cdot \cos(\theta - 2\pi f_x \cdot t_i)$$

where B is an amplitude, and
$\theta$ is a phase difference.

The convolution calculating sub section 161 calculates a convolution $X = (V_{xa} * V_{xsa})(\theta)$ between the drive voltage $V_{xa}$ and the sense voltage $V_{xsa}(t_i)$ by $$X = \Sigma AB \cdot \sin(2\pi f_x \cdot t_i) \cdot \cos(\theta - 2\pi f_x \cdot t_i).$$

The convolution calculating sub section 162 calculates a convolution $Y = (V_{xa}' * V_{xsa})(\theta)$ between the voltage $V_{xa}'$ and the sense voltage $V_{xsa}(t_i)$ by $$Y = \Sigma AB \cdot \cos(2\pi f_x \cdot t_i) \cdot \cos(\theta - 2\pi f_x \cdot t_i).$$

In the convolution calculating sub sections 161 and 162, there are 1000 or more timing points $t_i$ within one period $1/f_x$ to suppress the noise.

The convolutions X and Y form an X-coordinate value and a Y-coordinate value of an orthogonal coordinate.

The orthogonal coordinate-to-polar coordinate converting sub section 163 converts the orthogonal coordinate (X, Y) calculated by the calculating sub sections 161 and 162 into a polar coordinate (R, $\theta$) by $$R(f_x) = \sqrt{(X^2 + Y^2)}$$

$$\theta(f_x) = \tan^{-1}(X/Y)$$

where $R(f_x)$ is a radius component showing the intensity (amplitude) of the sense voltage $V_{xsa}$, i.e., the maximum flexing angle of the mirror 191; and
$\theta(f_x)$ is an angle component showing the phase difference between the drive voltage $V_{xa}$ and the sense voltage $V_{xsa}$, determined by a delay time by the operation of the mirror 191, a delay of transmission of signals through connections and the like.

Figure 8A:
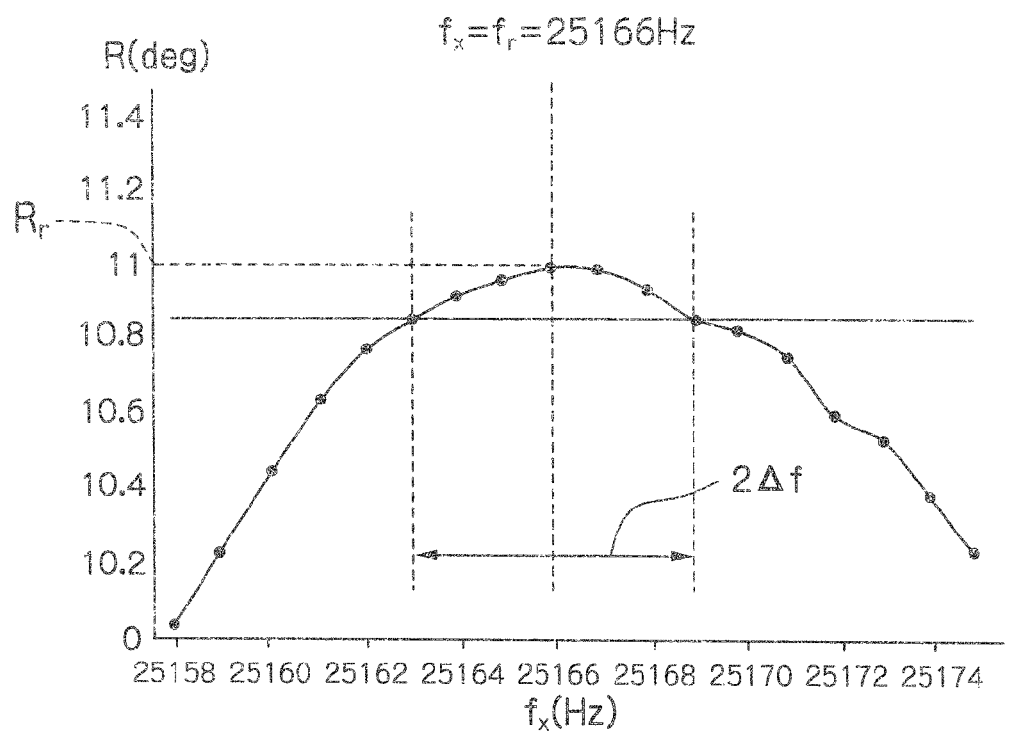
FIG. 8A is a graph illustrating a relationship between the frequency and the radius component R of the polar coordinate (R, θ) of FIG. 7.
Figure 8B:
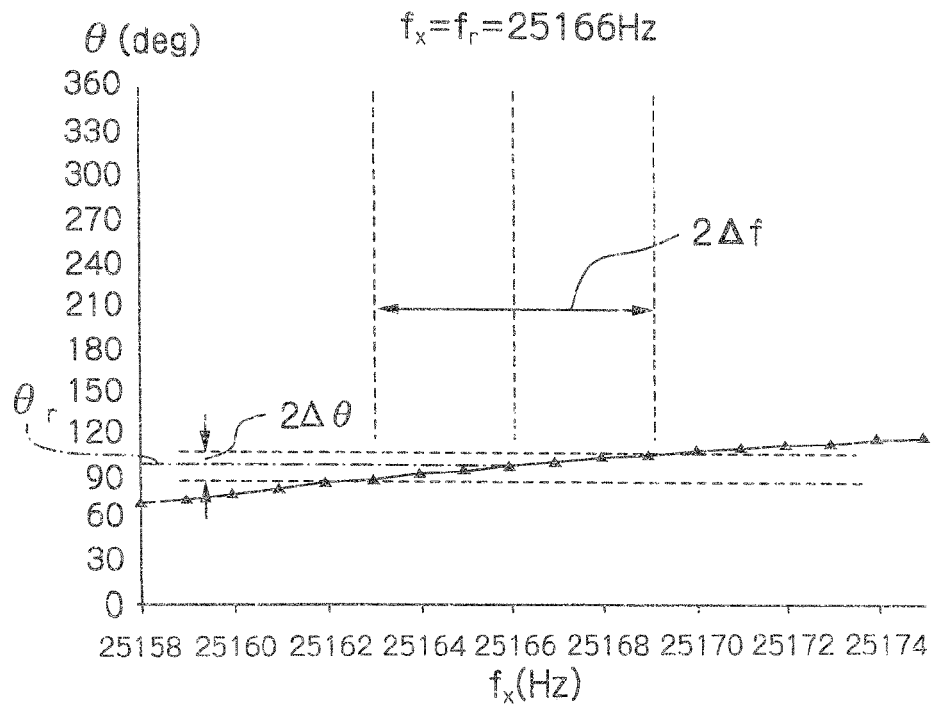
FIG. 8B is a graph illustrating a relationship between the frequency and the angle component θ of the polar coordinate (R, θ) of FIG. 7.

The drive signal generating section 15 sweeps the frequency $f_x$ of the drive voltage $V_{xa}$ to drive the MEMS optical deflector 19 to obtain a radius component $R(f_x)$ as shown in FIG. 8A and an angle component $\theta(f_x)$ as shown in FIG. 8B from the drive signal processing section 16. In FIG. 8A, the radius component R is represented by a flexing angle (deg) of the mirror 191.

As illustrated in FIG. 8A, when the radius component R is maximum, i.e., $R=R_r=11°$, the frequency $f_x$ is a resonant frequency $f_r$, in this case, 25166 Hz. If the allowance range of the radius component R is within one percent of the maximum radius component $R_r$, $\Delta f=3$ Hz, the allowance range of the resonant frequency is from $f_r - \Delta f (=25163$ Hz) to $f_r + \Delta f$ (=25169 Hz).

As illustrated in FIG. 8B, the angle component $\theta$ is $\theta_r = 100°$ at the resonant frequency $f_x = f_r$. Also, the allowance $\Delta \theta$ of the angle component $\theta$ is 5° corresponding to $\Delta f = 3$ Hz.

Figure 9A:
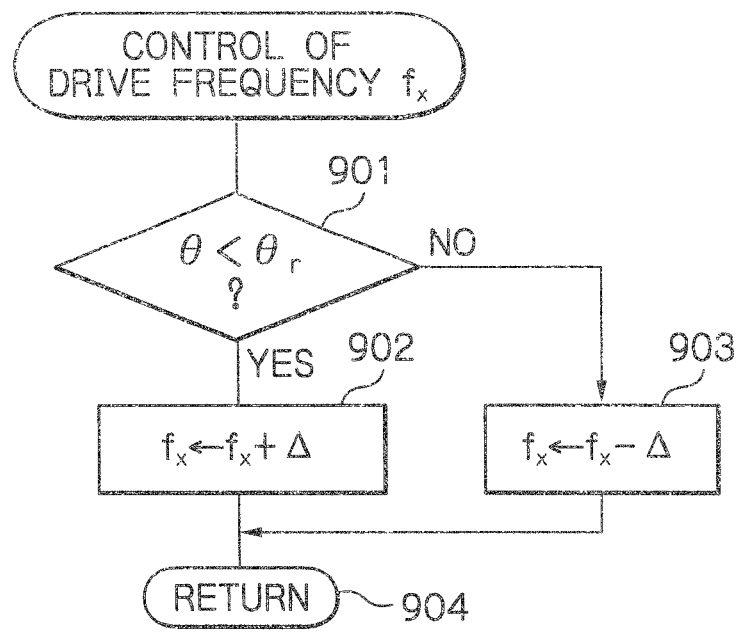
FIGS. 9A and 9B are flowcharts for explaining the operation of the drive signal generating section of FIG. 1.
Figure 9B:
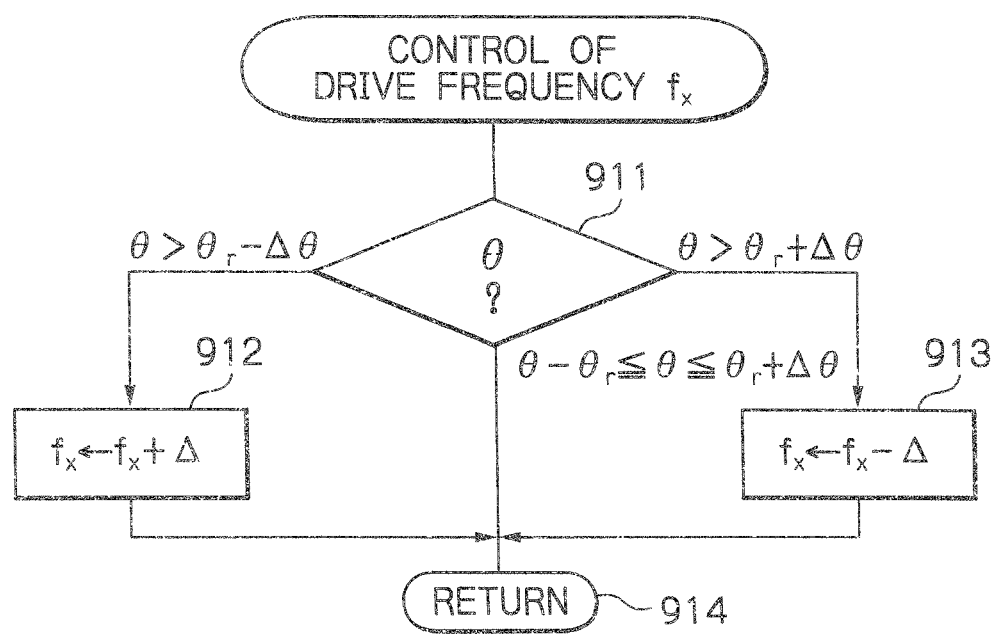

As illustrated in FIG. 8B, the angle component (phase difference) $\theta$ has a linear relationship with the drive frequency $f_x$. Therefore, the control of the frequency $f_x$ of the drive voltage $V_{xa}$ can be carried out by monitoring the angle component $\theta$ as illustrated in FIGS. 9A and 9B. Note that the flowcharts of FIGS. 9A and 9B are carried out by the drive signal generating section 15 at every predetermined time period.

At step 901 of FIG. 9A, it is determined whether or not $\theta < \theta_r$ is satisfied. As a result, when $\theta < \theta_r$, the control proceeds to step 902 which increases the angle component $\theta$ by $\Delta$ (positive value). On the other hand, when $\theta \geq \theta_r$, the control proceeds step 903 which decreases the angle component $\theta$ by $\Delta$. Then, the control proceeds to step 904. Thus, the angle component $\theta$ is brought close to $\theta_r$, thus maintaining a projected view field, even if the frequency $f_x$ is deviated from the resonant frequency $f_r$.

Similarly, at step 911, it is determined whether $\theta$ satisfies $\theta > \theta_r - \Delta \theta$, $\theta_r - \Delta \theta \leq \theta \leq \theta_r + \Delta \theta$ or $\theta > \theta_r + \Delta \theta$. As a result, when $\theta < \theta_r - \Delta \theta$, the control proceeds to step 912 which increases the angle component $\theta$ by $\Delta$, while, when $\Delta \theta \geq \theta_r + \Delta \theta$, the control proceeds step 913 which decreases the angle component $\theta$ by $\Delta$. Then, the control proceeds to step 914. On the other hand, when $\theta_r - \Delta \theta \leq \theta \leq \theta_r + \Delta \theta$, the control proceeds directly to step 914. Thus, the angle component $\theta$ is brought close to $\theta_r$, thus maintaining a projected view field, even if the frequency $f_x$ is deviated from the allowable range $(f_r - \Delta f \sim f_r + \Delta f)$ of the resonant frequency $f_r$. In this case, since no change is performed upon the angle component $\theta$ when $\theta_r - \Delta \theta \leq \theta \leq \theta_r + \Delta \theta$, chattering due to the noise can be prevented.

Figure 10:
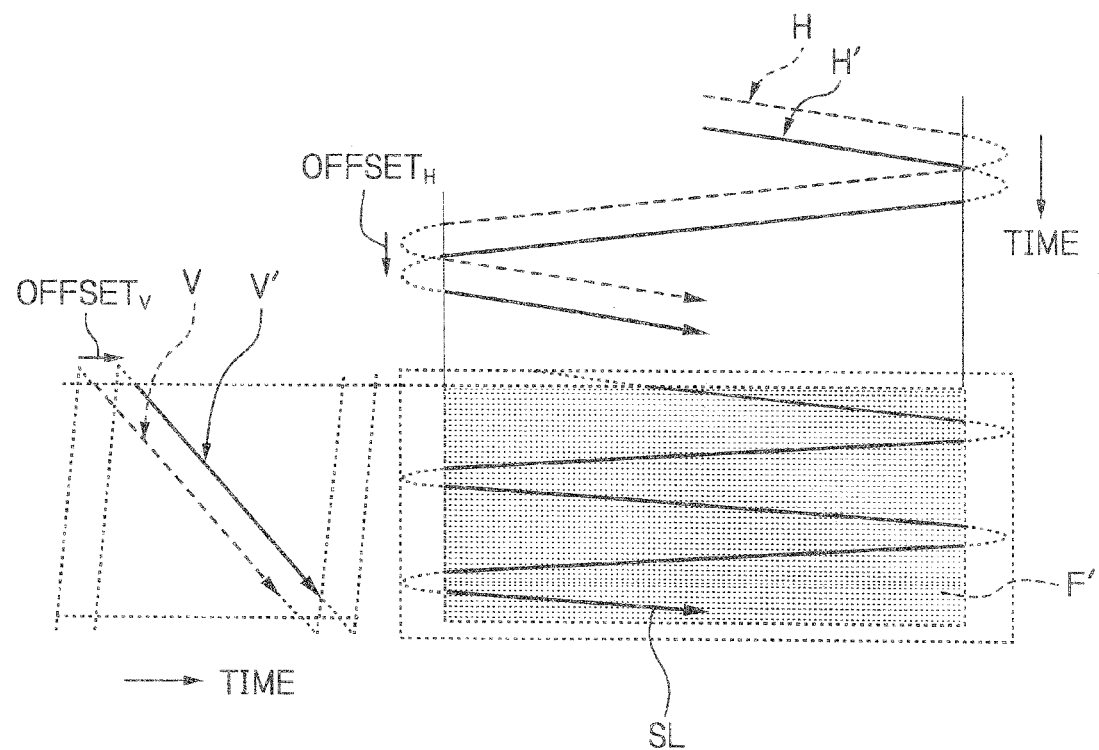
FIG. 10 is a diagram showing the relationship between a scanning locus of the light source drive unit and a projected view field of the laser beam of the laser light source of FIG. 1.

As illustrated in FIG. 10, which illustrates a relationship between a scanning locus of the light source drive unit 21 and a projected view field of the laser beam of the laser light source 22 of FIG. 1, since the drive voltages $V_{xa}$ and $V_{yb}$ are delayed by the mechanical operation of the MBMS optical deflector 19 and the like, the drive signal processing section 16 copies the horizontal scanning line H and the vertical scanning line V of the drive voltages $V_{xa}$ and $V_{ya}$ from the drive signal generating section 15 and delays the horizontal scanning line H and the vertical scanning line V by offsets $OFFSET_H$ and $OFFSET_V$ to generate horizontal scanning line H' and vertical scanning line V'. Thus, the light source drive unit 21 is driven by the horizontal scanning line H' and the vertical scanning line V'. As a result, a view field F' can be surely projected on the screen 2. Also, since the drive system for the drive unit 18 and the MEMS optical deflector 19 is separated from the drive system for the pixel data extracting section 17, the light source drive unit 21 and the laser light source 22, the electromagnetic interference (EMI) noises therebetween can be suppressed.

In FIG. 2, note that the inner piezoelectric actuators 193a and 193b and the torsion bars 194a and 194b can be replaced by meander-type piezoelectric actuators.

In the above-described embodiment, the MEMS optical deflector 19 can be a MEMS electromagnetic optical deflector or a MEMS electrostatic optical deflector.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A video projection apparatus comprising:
    a light source;
    an optical deflector having a mirror for reflecting light from said light source to project a view field, an actuator for rocking said mirror with an axis of said mirror and a sensor provided in the vicinity of said actuator; and
    a control unit adapted to:
        generate a first sinusoidal-wave voltage applied to said actuator and a second sinusoidal-wave voltage having a same frequency as that of said first sinusoidal-wave voltage and a difference in phase of 90° to said first sinusoidal-wave voltage;
        calculate a first convolution between said first sinusoidal-wave voltage and a sense voltage from said sensor;
        calculate a second convolution between said second sinusoidal-wave voltage and said sense voltage;
        convert an orthogonal coordinate formed by said first convolution and said second convolution into a polar coordinate formed by a radius component and an angle component; and
        sweep the frequency of said first and second sinusoidal-wave voltages so that the frequency of said first and second sinusoidal-wave voltages is defined as a resonant frequency when said radius component is maximum.

2. The video projection apparatus as set forth in claim 1, wherein said angle component is defined as an optimum angle component when said radius component is maximum, and
    wherein said control unit is adapted to adjust the frequency of said first and second sinusoidal-wave voltages so that said angle component is brought close to said optimum angle component.

3. The video projection apparatus as set forth in claim 2, wherein said control unit is adapted to:
    determine whether or not said angle component is smaller than said optimum angle component;
    increase the frequency of said first and second sinusoidal-wave voltages when it is determined that said angle component is smaller than said optimum angle component; and
    decrease the frequency of said first and second sinusoidal-wave voltages when it is determined that said angle component is not smaller than said optimum angle component.

4. The video projection apparatus as set forth in claim 2, wherein said control unit is adapted to:
    determine whether or not said angle component is smaller than a first threshold value smaller than said optimum angle component;
    determine whether or not said angle component is larger than a second threshold value larger than said optimum angle component;
    increase the frequency of said first and second sinusoidal-wave voltages when it is determined that said angle component is smaller than said first threshold value; and
    decrease the frequency of said first and second sinusoidal-wave voltages when it is determined that said optimum angle component is larger than said second threshold value.

5. A method for controlling a video projection apparatus, said video projection apparatus comprising a light source and an optical deflector having a mirror for reflecting light from said light source to project a view field, an actuator for rocking said mirror with an axis of said mirror and a sensor provided in the vicinity of said actuator, and said method comprising:
    generating a first sinusoidal-wave voltage applied to said actuator and a second sinusoidal-wave voltage having a same frequency as that of said first sinusoidal-wave voltage and a difference in phase of 90° to said first sinusoidal-wave voltage;
    calculating a first convolution between said first sinusoidal-wave voltage and a sense voltage from said sensor;
    calculating a second convolution between said second sinusoidal-wave voltage and said sense voltage;
    converting an orthogonal coordinate formed by said first convolution and said second convolution into a polar coordinate formed by a radius component and an angle component; and
    sweeping the frequency of said first and second sinusoidal-wave voltages so that the frequency of said first and second sinusoidal-wave voltages is defined as a resonant frequency when said radius component is maximum.

6. The method as set forth in claim 5, wherein said angle component is defined as an optimum angle component when said radius component is maximum, and
    wherein said method further comprises adjusting the frequency of said first and second sinusoidal-wave voltage so that said angle component is brought close to said optimum angle component.

7. The method as set forth in claim 6, further comprising:
    determining whether or not said angle component is smaller than said optimum angle component;
    increasing the frequency of said first and second sinusoidal-wave voltages when it is determined that said angle component is smaller than said optimum angle component; and
    decreasing the frequency of said first and second sinusoidal-wave voltages when it is determined that said angle component is not smaller than said optimum angle component.

8. The method as set forth in claim 6, further comprising:
    determining whether or not said angle component is smaller than a first threshold value smaller than said optimum angle component;
    determining whether or not said angle component is larger than a second threshold value larger than said optimum angle component;
    increasing the frequency of said first and second sinusoidal-wave voltages when it is determined that said angle component is smaller than said first threshold value; and decreasing the frequency of said first and second sinusoidal-wave voltage when it is determined that said optimum angle component is larger than said second threshold value.

* * * * *